(12) United States Patent
Kuroda et al.

(10) Patent No.: US 8,098,743 B2
(45) Date of Patent: Jan. 17, 2012

(54) PILOT SIGNAL TRANSMISSION METHOD AND RADIO COMMUNICATION SYSTEM FOR ENABLING MEASUREMENT OF RECEPTION QUALITY WITH HIGH ACCURACY

(75) Inventors: Nahoko Kuroda, Tokyo (JP); Jinsock Lee, Tokyo (JP); Kojiro Hamabe, Tokyo (JP); Akihisa Ushirokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1320 days.

(21) Appl. No.: 11/659,651

(22) PCT Filed: Aug. 4, 2005

(86) PCT No.: PCT/JP2005/014273
§ 371 (c)(1),
(2), (4) Date: Feb. 6, 2007

(87) PCT Pub. No.: WO2006/016515
PCT Pub. Date: Feb. 16, 2006

(65) Prior Publication Data
US 2007/0253450 A1 Nov. 1, 2007

(30) Foreign Application Priority Data
Aug. 11, 2004 (JP) ................................. 2004-234097

(51) Int. Cl.
*H04B 14/06* (2006.01)
(52) U.S. Cl. ........ 375/252; 375/133; 375/135; 375/141; 375/146; 375/147; 375/297
(58) Field of Classification Search .................. 375/252, 375/133, 135, 141, 146, 147, 297
See application file for complete search history.

(56) References Cited

U.S. PATENT DOCUMENTS
2002/0055367 A1* 5/2002 Hamabe et al. ............... 455/522
2003/0118057 A1* 6/2003 Ushirokawa et al. ......... 370/522
(Continued)

FOREIGN PATENT DOCUMENTS
JP 2001-204075 * 7/2001
(Continued)

OTHER PUBLICATIONS

"[E]-SPICH Multiplexing Options", QUALCOMM, 3GPP RAN WG1, 33rd Conference, RI-030673 "Overview of Techniques Considered to Support Enhanced Uplink", 3GPP TR 25.896, vol. 6.0.0, Mar. 2004.*

(Continued)

*Primary Examiner* — Kabir A Timory
(74) *Attorney, Agent, or Firm* — Scully, Scott, Murphy & Presser, P.C.

(57) ABSTRACT

In a pilot signal transmission method for raising the SIR measurement accuracy for transmission power control during high-speed transmission and thus reducing the block error rate and improving the throughput, a first SIR value measured by first pilot signals and second SIR value measured by second pilot signals are first compared, and the presence or absence of second pilot signals then determined in slot units based on the comparison results. When the second pilot signals exist, the second pilot signals are used in addition to the first pilot signals in the SIR measurement for high-speed closed-loop transmission power control. When the second pilot signals do not exist, only the first pilot signals are used in the SIR measurement for high-speed closed-loop transmission power control.

11 Claims, 12 Drawing Sheets

U.S. PATENT DOCUMENTS

2003/0169707 A1* 9/2003 Usuda et al. .................. 370/334
2004/0190475 A1* 9/2004 Hamalainen et al. ......... 370/335
2005/0009551 A1* 1/2005 Tsai et al. ..................... 455/522

FOREIGN PATENT DOCUMENTS

| JP | 2002-152128 | * | 5/2002 |
| JP | 2003-037554 | * | 2/2003 |
| JP | 2003-318821 | | 11/2003 |
| JP | 2004-159299 | | 6/2004 |
| WO | WO 03/044989 A1 | * | 5/2003 |
| WO | WO 03/105381 A2 | * | 12/2003 |

OTHER PUBLICATIONS

Japanese Official Action dated Aug. 17, 2011 issued in related case, namely, JP-2004-2340897.

* cited by examiner

PRIOR ART

PRIOR ART

PRIOR ART

PILOT SIGNAL TRANSMISSION METHOD AND RADIO COMMUNICATION SYSTEM FOR ENABLING MEASUREMENT OF RECEPTION QUALITY WITH HIGH ACCURACY

TECHNICAL FIELD

The present invention relates to a pilot signal transmission method in a radio communication system that performs high-speed packet transmission.

BACKGROUND ART

In a radio communication system, Rayleigh fading occurs with the movement of mobile stations. This Rayleigh fading gives rise to amplitude fluctuation and phase fluctuation in the communication channels. As a result, in a radio communication system such as WCDMA, the transmitting side transmits an already known signal string (pilot signal) on the receiving side. The receiving side estimates the phase fluctuation and amplitude fluctuation of the propagation path based on the differences between the received points of the pilot signal and the already known transmission points (channel estimation). Based on this channel estimation, the receiving side then corrects the fluctuation of the phase and amplitude of an information signal that contains a control signal or data signal (channel elimination).

FIG. 1 shows the use of estimated channels to eliminate the influence of channels from an information signal that has been received in communication that uses QPSK modulation. In phase modulation such as QPSK, phase fluctuation θ that results from the influence of channels is found, and the reception point (R) is moved back by θ to find the reception point (R') from which the influence of channels has been removed. Generally, in a WCDMA system, higher transmission speeds call for higher accuracy in channel estimation. In WCDMA, the interference component is reduced by the spreading of signals. In high-speed transmission, however, the spreading rate is set low, and the rate of reduction of the interference component is therefore also low.

FIG. 2A shows channel elimination in the case of a high interference component (high-speed transmission). FIG. 2B shows channel elimination in the case of a low interference component (low-speed transmission). When the interference component is high, the spreading of signal points is great, and the circle of distribution of reception points shown in the figure expands. When channel estimation value θ error having low estimation accuracy is used to eliminate channels, the region in which reception error occurs shown by the darkened portion in the figure increases as the interference component increases. Accordingly, in high-speed transmission, a lower rate of reduction of the interference component brought about by spreading calls for greater accuracy in channel estimation values.

Alternatively, in a cellular system that uses direct-sequence spread-spectrum code division multiple access (DS-CDMA) such as a WCDMA system, the same frequency band is used on a plurality of channels, and electromagnetic waves of other channels therefore cause interference. When interference increases, the reception quality of the desired wave deteriorates, causing problems such as circuit disconnections. Accordingly, the number of circuits in which desired reception quality is maintained to realize communication, i.e., the circuit capacity, depends on the amount of interference. In an uplink, the power of a signal that is transmitted by a mobile station remote from a base station undergoes more attenuation than a signal that is transmitted by a mobile station close to the base station. As a result, when these mobile stations transmit signals at the same power, the problem of distance occurs in which the reception power of interference waves from the near mobile station is greater than the reception power of the desired wave from the remote mobile station, and communication with the remote mobile station therefore becomes problematic.

Accordingly, transmission power control is an essential technology on uplinks for controlling the transmission power of each mobile station such that the signal from each mobile station has equivalent reception power at the base station. The base station controls the transmission of mobile stations to realize the minimum necessary transmission power that can maintain the reception quality (reception power-to-interference power ratio or SIR) at a required quality (target SIR). The transmission power control for each mobile station is closed-loop control. The base station compares the measured SIR with a prescribed target SIR, and transmits to a mobile station a transmission power control (TPC) signal instructing that the transmission power be lowered when the measured SIR is higher than the target SIR. Alternatively, when the measured SIR is lower than the target SIR, the base station transmits to the mobile station a TPC signal instructing that the transmission power be raised. By implementing this type of closed-loop control for each slot, the transmission power follows high-speed propagation path fluctuation.

Individual channels for performing communication by circuit switching and EUDCH for high-speed packet transmission are provided in WCDMA uplink channels (Refer to: 3GPPTR25.896 v6.0.0 (2004-03) Third Generation Partnership Project; Technical Specification Group Radio Access Network; Feasibility Study for Enhanced Uplink for UTRA FDD (Release 6)). The individual channels are composed of a DPDCH (Dedicated Physical Data Channel) for transmitting data and a DPCCH (Dedicated Physical Control Channel) for transmitting control signals. The EUDCH is similarly composed of E-DPDCH for transmitting data and E-DPCCH for transmitting control signals. One frame of each channel is composed of 15 slots. Data blocks are transmitted for each prescribed transmission time interval (TTI) by means of each channel. For the TTI of individual channels, any of 1, 2, 4, or 8 frames are used. The TTI of EUDCH are unfixed, but the use of either one frame or ⅕ frame (1 subframe) that is shorter than one frame is predetermined.

FIG. 3 shows the frame configuration of an individual channel. DPCCH contains: the pilot signal, TFCI, FBI, and TPC bits. The pilot signal is used in the above-described channel estimation and SIR measurement. TFCI is a 30-bit control signal for reporting the DPCCH transmission format (data block size and number of blocks) in each TTI; and is transmitted divided into two bits for each slot. Accordingly, after receiving all of one frame, the base station collects and decodes the TFCI that have been divided among the slots and then uses these decoded TFCI to decode DPDCH.

The FBI bits are a field for sending feedback signals that are necessary for other functions in the downlink circuit. TPC is a field for sending the above-described high-speed closed-loop transmission power control signals. In WCDMA, the uplink and downlink of individual channels are paired and are used mutually in the transfer of the transmission power control signals. The EUDCH channels are transmitted at a power obtained by adding an offset power to the individual channels. The EUDCH frame configuration is not yet determined in 3GPP, but TFCI (E-TFCI) of EUDCH exists as a signal transmitted by E-DPCCH. This TFCI is for notifying the transmission format of E-DPCH in this TTI, as with individual channels.

Pilot signals are necessary for channel estimation, but the pilot signals of individual channels can be used in channel estimation. In addition, the base station carries out scheduling such that the noise rise (received signal power to noise ratio) at the base station is no greater than a prescribed target value, and reports the radio resources assigned to mobile stations by EUDCH. Broadly defined, two methods have been investigated for scheduling. One method is referred to as time-transmission speed scheduling, and the other is referred to as transmission speed scheduling.

In time-transmission speed scheduling, the base station designates the transmission time interval and maximum transmission speed by means of scheduling information for each mobile station in which EUDCH is set. The mobile station transmits data blocks at no greater than the designated maximum transmission speed within the designated transmission time interval.

In transmission speed scheduling, on the other hand, the base station designates only the maximum transmission speed by means of the scheduling information. The mobile station may transmit data blocks at any timing as long as the transmission speed is no greater than the maximum transmission speed. The scheduling information can be transmitted for each TTI.

As described above, high-speed packet transmission is carried out in EUDCH, and the transmission speed can be changed in TTI units. As previously described, the accuracy called for in channel estimation increases with higher transmission speeds.

In addition, a high transmission speed calls for high accuracy in the SIR measurement. This is because, since SIR is used in high-speed closed-loop transmission power control, low accuracy in SIR measurement results in degradation of the accuracy of power control, whereby the reception quality of pilot signals deteriorates, causing channel estimation accuracy to also deteriorate. As a result, high transmission speed necessitates greater accuracy in SIR measurement.

Generally, the accuracy of channel estimation and SIR measurement can be improved by either increasing the power of pilot signals with respect to data signals or by increasing the number of pilot bits within each slot. However, these methods increase the control signal overhead and increase the interference upon other mobile stations, and as a result, the constant implementation of these methods is usually not preferable. Accordingly, in EUDCH, improvement of the channel estimation accuracy and SIR measurement accuracy is necessary only in frames that carry out high-speed transmission.

This measure was proposed in "[E]-SPICH Multiplexing Options," QUALCOMM, 3GPP RAN WG1, 33$^{rd}$ Conference, RI-030673. According to this proposal, in frames in which a mobile station performs high-speed transmission, the transmission of second pilot signals by E-DPCCH is proposed. In this method, a prescribed transmission speed threshold value is determined, and the mobile station transmits second pilot signals on E-DPCCH if the transmission speed is equal to or greater than the threshold value. The base station decodes the E-TFCI and determines that the mobile station is transmitting the second pilot signals if the transmission speed is equal to or greater than the threshold value. In this case, the base station uses the second pilot signals together with the DPCCH pilot signals (first pilot signals) in channel estimation. If the transmission speed is lower than the threshold value, the mobile station does not transmit the second pilot signals, and as a result, the interference that is applied to other mobile stations is reduced when high-accuracy channel estimation is not necessary.

DISCLOSURE OF THE INVENTION

Nevertheless, in this solution, there are cases in which the second pilot signal cannot be used in SIR measurement for transmission power control. As previously described, the TFCI in DPCCH are divided among all slots in one frame to raise the error correction rate. When E-TFCI is also similarly divided among all slots or a plurality of slots in one TTI, the base station cannot determine whether the second pilot signals have been transmitted or not until the base station has received all of the E-TFCI and has decoded the E-TFCI. As previously explained, high-speed closed-loop transmission power control is control implemented in slot units, and a TPC signal must be transmitted after 1-2 slots following reception of the pilot signals. If the TPC signal is not transmitted in time, the base station cannot use the second pilot signals in SIR measurement even though the second pilot signals have been transmitted by the mobile station. In contrast, it may be assumed that the second pilot signals are always transmitted, and the base station may use the second pilot signals to carry out SIR measurement. In this case, when the second pilot signals are not being transmitted, noise is added to the SIR measurement, and the SIR measurement accuracy is therefore greatly degraded. As described hereinabove, when the SIR measurement accuracy deteriorates, the transmission power control accuracy also deteriorates, and as a result, the target reception quality cannot be achieved and the channel estimation accuracy deteriorates. The problems therefore result that block errors increase and throughput decreases.

It is an object of the present invention to provide a pilot signal transmission method, a radio communication system, a base station and a mobile station that can solve the above-described problems. More specifically, it is an object of the present invention to provide a pilot signal transmission method, a radio communication system, a base station, and a mobile station that, in a system that uses EUDCH to perform high-speed packet transmission, raise SIR measurement accuracy for transmission power control during high-speed transmission and thus decrease the block error rate and improve throughput.

To solve the above-described problems, the pilot signal transmission method, radio communication system, base station, and mobile station according to the present invention adopt the following characteristic configuration.

The mobile station transmits first pilot signals on a first channel, and transmits second pilot signals on a second channel according to the transmission speed of data that are transmitted on the second channel. The base station determines whether to use the second pilot signals depending on the reception quality of the first pilot signals and the second pilot signals.

When using the second pilot signals, the base station uses the first pilot signals and the second pilot signals to measure the reception quality. On the other hand, when not using the second pilot signals, the base station measures the reception quality by only the first pilot signals.

Based on the obtained reception quality measurement, the base station then generates transmission power control signals. The mobile station determines the transmission power of the first and second channels according to the transmission power control signals transmitted by the base station.

BEST MODE FOR CARRYING OUT THE INVENTION

The following explanation regards the details of the configuration and operation of preferable working examples of the present invention with reference to the accompanying figures. Explanation here regards an embodiment that uses EUDCH in WCDMA as an example.

Figure 1:
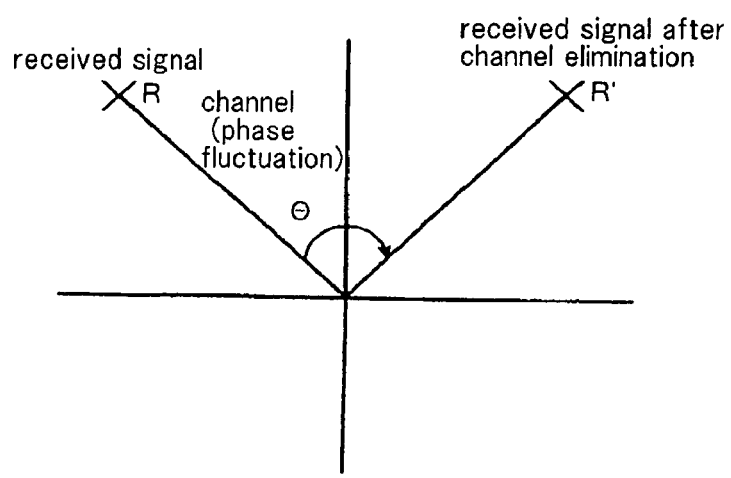
FIG. 1 is a view for explaining the method of using the channel estimation results.
Figure 2A:
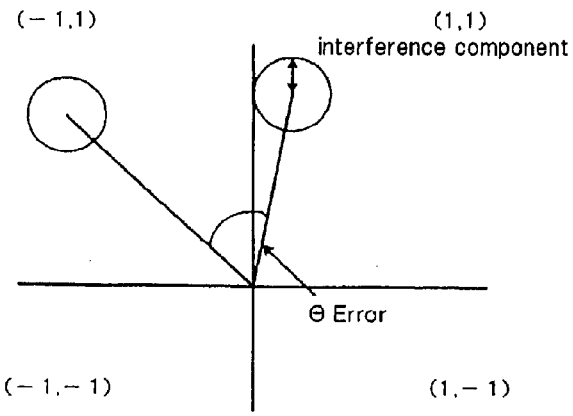
FIG. 2A shows channel elimination when the interference component is high (high-speed transmission)
Figure 2B:
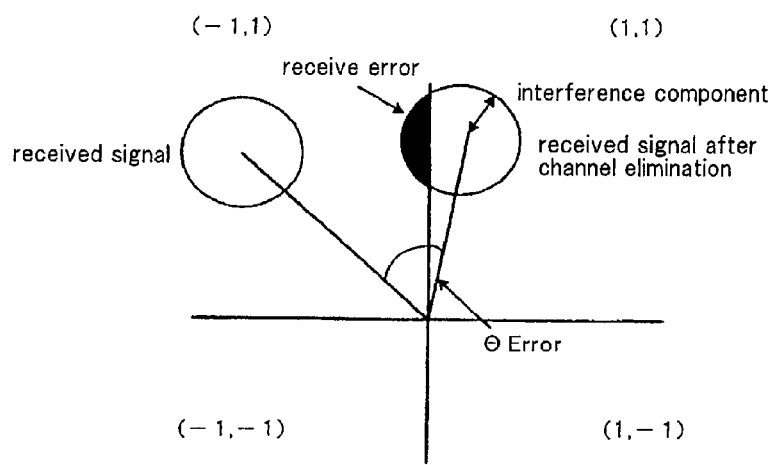
FIG. 2B shows channel elimination when the interference component is low (low-speed transmission)
Figure 3:
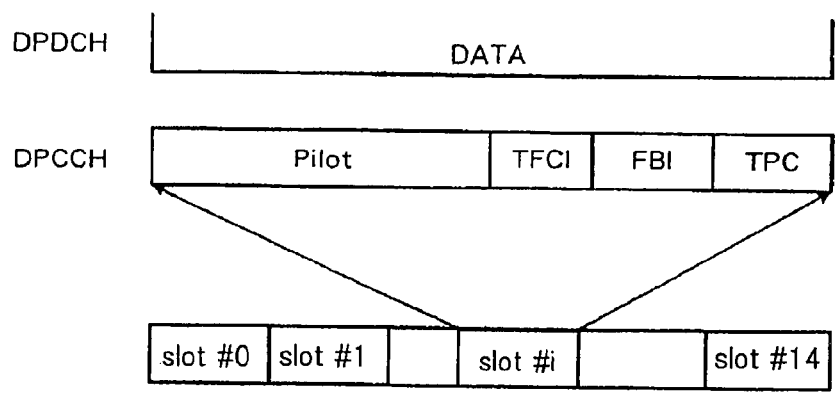
FIG. 3 shows the frame composition of an individual channel.
Figure 4:
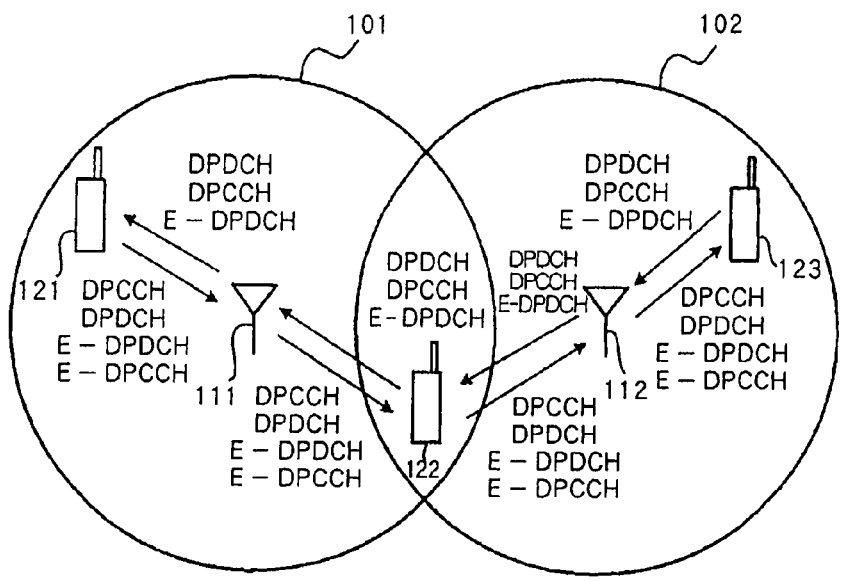
FIG. 4 shows the composition of the cellular system that is common to each of the working examples of the present invention.

FIG. 4 shows the composition of a cellular system that is common to the first to third working examples of the present invention. As shown in FIG. 4, mobile station 121 is connected only to base station 111, mobile station 123 is connected only to base station 112, and mobile station 122 is connected to both base stations. Mobile stations 121-123 further transmit to and receive from the base stations: DPDCH (UL/DL) for transmitting the data of individual channels, DPCCH (UL/DL) for transmitting control signals, E-DPDCH (UL) for transmitting the data of EUDCH, and E-DPCCH (UL/DL) for transmitting control signals. Base stations 111 and 112 are connected to a base station control device (not shown). The base station control device reports to mobile stations and base stations the sets (TFCS) of transport format combinations (TFC) that each mobile station is permitted to use. The TFC include parameters such as the number of blocks and the size of data blocks that are included in transmission time intervals (TTI). In this case, the TTI of an individual channel is assumed to be 15 slots, and the TTI of EUDCH is assumed to be 3 slots. The transmission speed of EUDCH differs according to the TFC, and the noise rise conferred to a base station increases with higher transmission speeds. Accordingly, a base station controls the change of noise rise in the base station by controlling the maximum TFC or the maximum transmission speed that can be used. Control information for this purpose is transmitted and received on E-DPCCH (UL/DL).

In addition, the base stations as well as the mobile stations transmit TPC (Transmission Power Control) signals on DPCCH for high-speed closed-loop transmission power control. The TPC signals are two-bit signals that are transmitted in each slot, and the base stations as well as mobile stations measure the reception SIR of pilot signals and transmit a TPC signal instructing decrease if power if the reception SIR of a pilot signal is higher than the target SIR, and transmit a TPC signal instructing increase of power if the reception SIR of a pilot signal is lower than the target SIR.

First Working Example

Explanation next regards the first working example.

Figure 5:
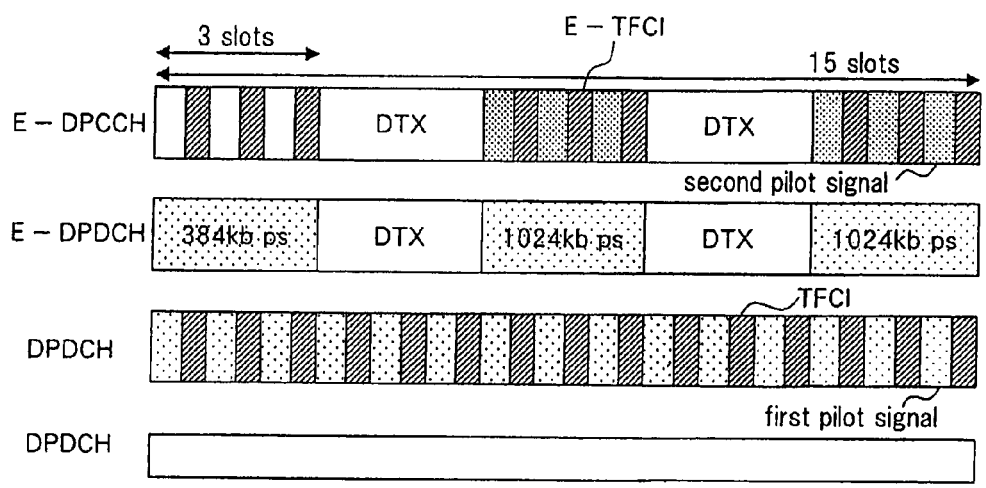
FIG. 5 is a view for explaining the method of transmitting pilot signals in the first working example of the present invention.

FIG. 5 shows the method of transmitting pilot signals in the first working example. For the sake of simplicity, only the pilot signals and TFCII signals are described as control signals. DPDCH and DPCCH are transmitted continuously. On the other hand, E-DPCCH and E-DPDCH are transmitted intermittently, and the second pilot signals that are contained in E-DPCCH are transmitted only when the transmission speed is at least a prescribed threshold value. In this case, the transmission speed threshold value is set at 1024 kbps. The transmission speed of the first (left side) data block in the figure is 384 kbps and thus lower than the transmission speed threshold value, and the second pilot signals are therefore not transmitted ("DTX" in the figure indicates "Discontinuous Tx," and means that transmission is OFF). However, the transmission speed of the subsequent data blocks is 1024 kbps, and the second pilot signals are therefore also transmitted. In addition, when the second pilot signals are transmitted, the second pilot signals are transmitted at the same transmission power as the first pilot signals.

The base station measures the reception quality SIR1 of the first pilot signals and the reception quality SIR2 of the second pilot signals, and determines that the second pilot signals have been transmitted when the following two conditions are both satisfied:

Condition 1: SIR1 is greater than a prescribed reception quality threshold value.

Condition 2: SIR2 is greater than a value obtained by subtracting a prescribed value $\Delta SIR$ from SIR 1.

In this case, the reception quality threshold value and the prescribed value $\Delta SIR$ are reported in advance to the base station, or are set beforehand as base station information.

Figure 6:
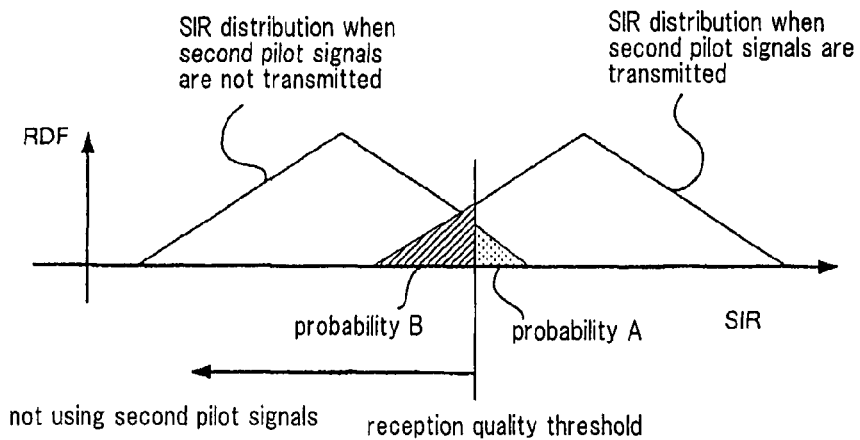
FIG. 6 shows the distribution of probability concentrations of SIR measurement values when second pilot signals are transmitted and not transmitted in the present invention.

Condition 1 is used for the following reasons. FIG. 6 shows the distribution of probability concentrations of SIR measurement values when the second pilot signals are transmitted and when not transmitted. When a base station is detecting the presence or absence of the second pilot signals based on the SIR measurement value of the second pilot signals, the following two detection error patterns can occur:

Detection Error 1: The second pilot signals have been transmitted but the base station determines that the second pilot signals have not been transmitted.

Detection Error 2: The second pilot signals have not been transmitted, but the base station determines that the second pilot signals have been transmitted.

The occurrence of Detection Error 2 is undesirable because the base station uses the second pilot signals to add noise to the SIR measurement, causing the accuracy of the SIR measurement to drop precipitously. The reception quality threshold value should therefore be set such that the probability of the occurrence of Detection Error 2 is less than the probability of occurrence of Detection Error 1. Accordingly, the reception quality threshold value should be set such that probability A in FIG. 6 is lower than probability B. In addition, since the first pilot signals and second pilot signals are transmitted at the same power, SIR2 and SIR1 are substantially equal when the second pilot signals are transmitted. As a result, when SIR1 is measured and found to be lower than the reception quality threshold value in Condition 1 of the present embodiment, the second pilot signals are not used so as to reduce the probability of the occurrence of Detection Error 2.

If Condition 1 is satisfied, the base station measures SIR2 and checks whether Condition 2 is satisfied or not. As previously explained, SIR1 and SIR2 should be substantially the same value when the second pilot signals are being transmitted. Accordingly, the base station determines that the second pilot signals are being transmitted if the inequality SIR2>SIR1−ΔSIR, which takes into consideration ΔSIR as a prescribed margin, is satisfied, i.e., if Condition 2 is satisfied. ΔSIR is a set value determined by, for example, the reception capability of the base station or the slot composition.

The base station detects the presence or absence of the second pilot signals by the above-described procedure and then measures SIR for channel estimation and transmission power control using only the first pilot signals upon determining that the second pilot signals are not being transmitted and using the second pilot signals together with the first pilot signals upon determining that the second pilot signals are being transmitted. The SIR measurement is carried out as follows:

DEFINITION

The first and second pilot signals that have been transmitted:

$$p_1[l], p_2[l] \qquad (1)$$

The first and second pilot signals that have been received:

$$r_1[l], r_2[l] \qquad (2)$$

The interference component that is added to the first and second pilot signals:

$$n_1[l], n_2[l] \qquad (3)$$

The number of symbols of the first and second pilot signals:

$$L \qquad (4)$$

Channels that have been estimated only by the first pilot signals, and channels that have been estimated by both the first and second pilot signals:

$$\hat{h}_1, \hat{h}_T \qquad (5)$$

The interference component that has been estimated by only the first pilot signals, and the interference component that has been estimated by both the first and second pilot signals:

$$\hat{\sigma}_1^2, \hat{\sigma}_T^2 \qquad (6)$$

Calculation

Based on the above definitions, SIR is found as shown below when SIR is calculated using only the first pilot signals:

$$\hat{h}_1 = \frac{1}{L} \sum_{l=1}^{L} r_1[l] \cdot p_1[l] \qquad (7)$$

$$\hat{\sigma}_1^2 = 1/L \sum_{l=1}^{L} (r_1[l] \cdot r_1[l])^2 - \hat{h}_1^2 \qquad (8)$$

$$SIR = \frac{\hat{h}_1^2}{\hat{\sigma}_1^2} \qquad (9)$$

On the other hand, SIR is found as follows when both the first and second pilot signals are used to calculate SIR:

$$\hat{h}_T = \frac{1}{2L} \left( \sum_{l=1}^{L} r_1[l] \cdot p_1[l] + \sum_{l=1}^{L} r_2[l] \cdot p_2[l] \right) \qquad (10)$$

$$\hat{\sigma}_T^2 = \frac{1}{2} \left( 1/L \sum_{l=1}^{L} (r_1[l] \cdot r_1[l])^2 + 1/L \sum_{l=1}^{L} (r_2[l] \cdot r_2[l])^2 \right) - \hat{h}_T^2 \qquad (11)$$

$$SIR = \frac{\hat{h}_T^2}{\hat{\sigma}_T^2} \qquad (12)$$

Figure 7:
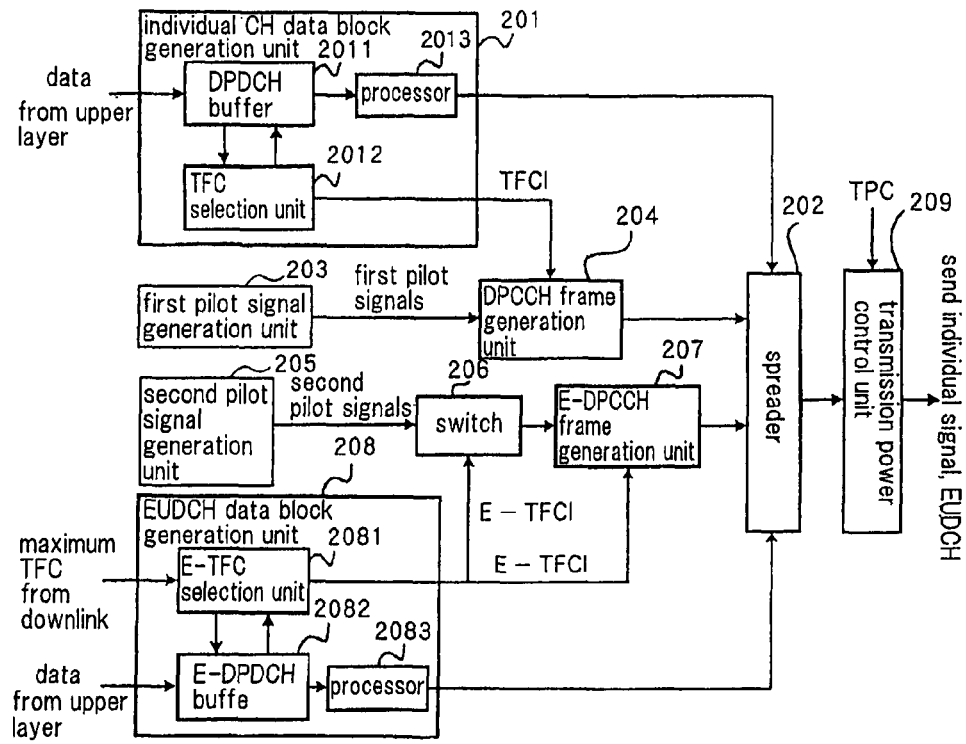
FIG. 7 shows the configuration of a mobile station in the first working example of the present invention.

FIG. 7 shows the configuration of a mobile station that is used in the present embodiment.

In FIG. 7, the composition is shown from the generation of data that are transmitted by the four channels DPDCH, DPCCH, E-DPCCH, and E-DPDCH until the power control following spreading.

Regarding DPDCH, individual CH data (DPDCH) block generation unit 201 generates data blocks that are to be transmitted in one TTI for each TTI. The data blocks that are to be transmitted in one TTI are generated in accordance with TFC that have been selected by TFC selection unit 2012 while taking into consideration factors such as the priority of data from the amount of data in individual channel data buffer 2011 from a upper layer. DPDCH buffer 2011 then sends the generated data blocks to processor 2013, where the data blocks undergo encoding and interleaving. The processed data blocks are then sent to spreader 202 one slot at a time.

Regarding DPCCH, first pilot signal generation unit 203 generates first pilot signals for each slot, DPCCH frame generation unit 204 inserts the first pilot signals in prescribed fields of DPCCH together with TFCI information that has been selected in TFC selection unit 2012, and then sends the result to spreader 202. Regarding E-DPDCH, EUDCH block generation unit 208 generates data blocks that are to be transmitted in one TTI for each TTI. The data blocks that are to be transmitted in one TTI are generated in accordance with TFC that have been selected by E-TFC selection unit 2081 while taking into consideration factors such as the priority of data or the maximum TFC that has been designated by the base station from the amount of data in E-DPDCH buffer 2082 from an upper layer. E-DPDCH buffer 2082 then sends the generated data blocks to processor 2083, where data blocks undergo processing such as encoding and interleaving. Following processing, the data blocks are sent to spreader 202 one slot at a time.

Regarding E-DPCCH, second pilot signal generation unit 205 generates second pilot signals for each slot and sends the second pilot signals to E-DPCCH frame generation unit 207. Switch 206 is provided between second pilot signal generation unit 205 and E-DPCCH frame generation unit 207. E-TFC selection unit 2081 sends E-TFCI information used in the frame to switch 206. Switch 206 calculates the transmission speed from the E-TFCI, and sends second pilot signals to E-DPCCH frame generation unit 207 only when this transmission speed is at least 1024 kbps, which is the transmission speed threshold value. E-DPCCH frame generation unit 207 inserts second pilot signals or E-TFCI information into prescribed fields of the E-DPCCH and sends the result to spreader 202.

Spreader 202 spreads each of the data blocks and control signal frames that have been received and sends the result to transmission power control unit 209. Transmission power control unit 209 determines the transmission power of the DPCCH based on the TPC signal that is received in a downlink circuit and adds a prescribed power offset to the power of this DPCCH to determine the power of each channel.

Figure 8:
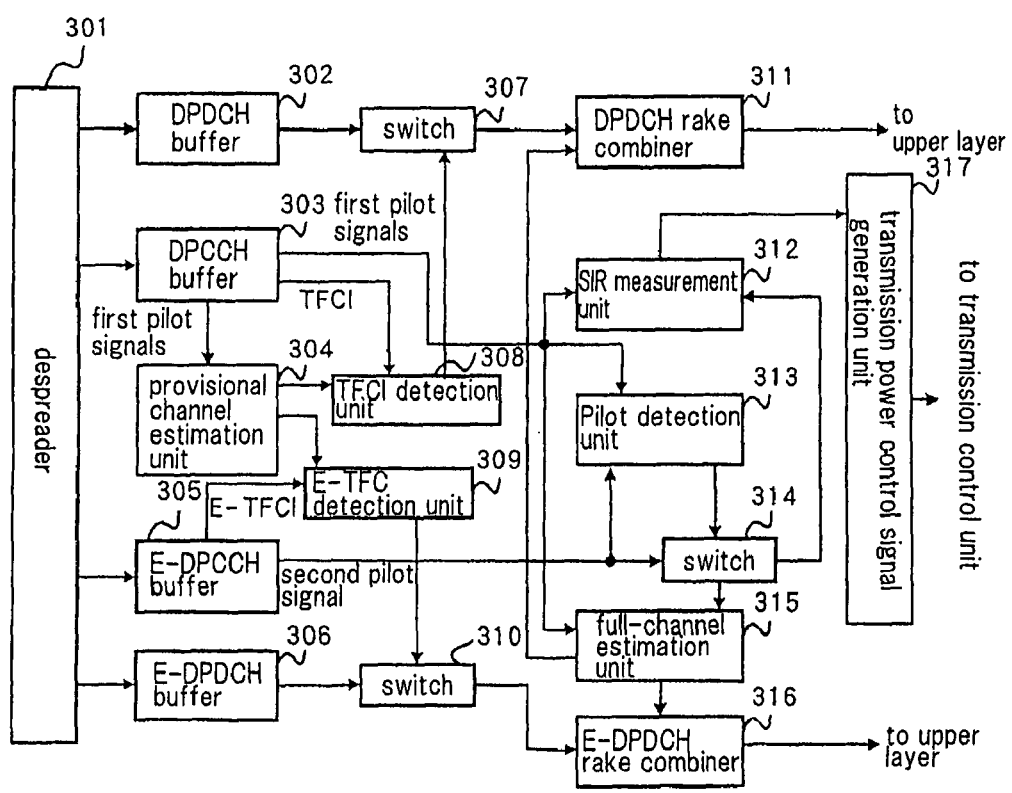
FIG. 8 shows the configuration of a base station in the first working example of the present invention.

FIG. 8 shows the configuration of a base station used in the first working example.

FIG. 8 shows the composition from the reception process by despreader 301 up to the sending of data to the upper layer.

Despreader 301 first despreads each of the four received channels DPDCH, DPCCH, E-DPDCH, and E-DPCCH. The control unit relating only to DPCCH is made up from buffer 303, provisional channel estimation unit 304, and TFCI detection unit 308. Buffer 303 stores the DPCCH that has undergone despreading. Provisional channel estimation unit 304 receives the first pilot signal and performs channel estimation. TFCI detection unit 308 detects TFCI from the result of channel estimation and the received signal of the TFCI field of DPCCH. TFCI detection unit 308 then sends the detected TFCI information to switch unit 307 that belongs to the control unit that relates to DPDCH.

The control unit that relates only to E-DPCCH is composed of E-DPCCH buffer 305 and E-TFCI detection unit 309. E-DPCCH buffer 305 stores E-DPCCH that has been despread. E-TFCI detection unit 309 detects E-TFCI from the channel estimation results sent by provisional estimation unit 304 and the received signal of the E-TFCI field. E-TFCI detection unit 309 then sends the detected E-TFCI information to switch unit 310 that belongs to the control unit that relates to E-DPDCH.

The control unit that is common to DPCCH and E-DPCCH is composed of pilot detection unit 313, SIR measurement unit 312, full-channel estimation unit 315, and switch 314. Pilot detection unit 313 uses the first and second pilot signals that have been received from DPCCH buffer 303 and E-DPCCH buffer 305 to detect the presence or absence of second pilot signals.

At this time, pilot detection unit 313 measures the first SIR value by the first pilot signals and measures the second SIR value by the second pilot signals. Pilot detection unit 313 then uses these values to determine whether second pilot signals are being transmitted by means of the above-described method.

When pilot detection unit 313 determines that second pilot signals are not being transmitted, pilot detection unit 313 turns switch 314 OFF such that second pilot signals are not sent to SIR measurement unit 312 and full-channel estimation unit 315. On the other hand, upon determining that second pilot signals are being transmitted, pilot detection unit 313 turns switch 314 ON such that second pilot signals are sent to SIR measurement unit 312 and full-channel estimation unit 315. SIR estimation unit 312 uses the pilot signals that have been sent in (both the first and second, or only the first) to measure SIR by the above-described method and sends the measurement result to transmission power control signal generation unit 317. Transmission power control signal generation unit 317 compares the measurement result with the target SIR and then generates and sends a TPC signal instructing an increase or decrease of power to the transmission control unit (not shown).

On the other hand, full-channel estimation unit 315 uses the pilot signals that have been sent in (both the first and second, or only the first) to estimate channels and then sends the estimation results to DPDCH rake combiner 311 and E-DPDCH rake combiner 316.

The control unit that relates only to DPDCH is composed of DPDCH buffer 302, switch 307, and DPDCH rake combiner 311. DPDCH buffer 302 stores DPDCH that has been despread. Switch 307 acquires TFCI information from TFCI detection unit 308, and when the data size indicated by the TFCI is not "0," sends the data in buffer 302 to DPDCH rake combiner 311. DPDCH rake combiner 311 uses the channel estimation value that is sent from full-channel estimation unit 315 to correct the amplitude fluctuation of the received signals of DPDCH, carries out rake synthesis, and sends the signal that has undergone rake synthesis to the upper layer (not shown).

The control unit that relates only to E-DPDCH is made up from E-DPDCH buffer 306, switch 310, and E-DPDCH rake combiner 316. E-DPDCH buffer 306 stores E-DPDCH that has been despread. Switch 310 acquires E-TFCI information from E-TFCI detection unit 309, and when the data size indicated by the E-TFCI is not "0," sends the data in buffer 306 to E-DPDCH rake combiner 316. E-DPDCH rake combiner 316 uses the channel estimation value sent from full-channel estimation unit 315 to correct the amplitude fluctuation of the received signal of E-DPDCH, carries out rake synthesis, and sends the signal that has undergone rake synthesis to the upper layer.

As described in the foregoing explanation, according to the present embodiment, a mobile station transmits second pilot signals when the transmission speed of E-DPDCH that is transmitted is higher than a prescribed transmission speed threshold value. However, the base station is not able to detect the transmission speed until after receiving all E-TFCI that is transmitted in the same TTI.

As a result, the prior art was not able to use second pilot signals in the SIR measurement that uses high-speed closed-loop transmission power control that generates TPC signals in slot units when the E-TFCI has been dispersed within a TTI.

According to the present embodiment, however, a base station compares a first SIR value that has been measured by first pilot signals with a second SIR value that has been measured by second pilot signals and determines the presence or absence of second pilot signals in slot units, and as a result, second pilot signals can also be used in SIR measurement for high-speed closed-loop transmission power control when second pilot signals exist, whereby the accuracy of transmission power control can be improved, channel reception quality can be improved, and throughput can be increased.

Second Working Example

Explanation next regards the details of the second working example of the present invention.

Figure 9:
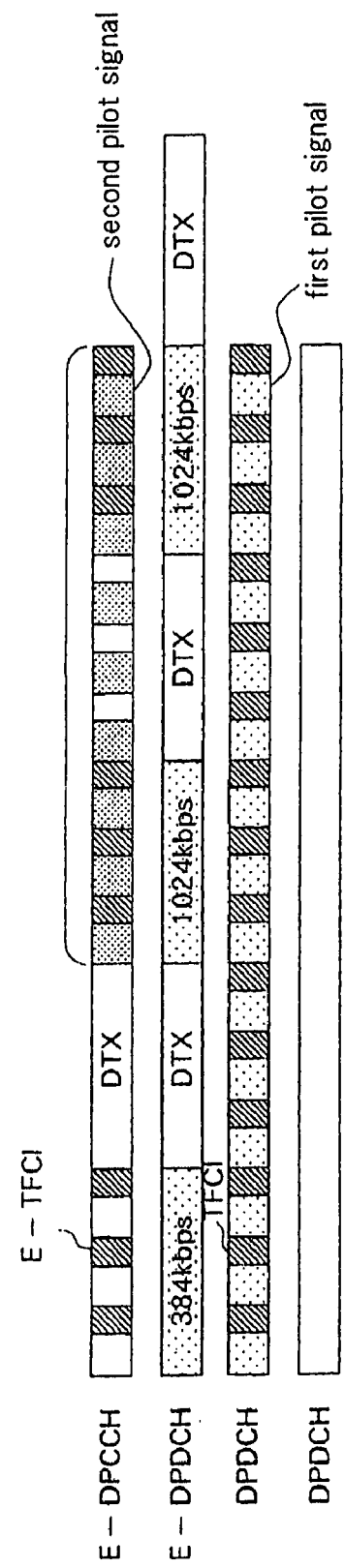
FIG. 9 is a view for explaining the method of transmitting pilot signals in the second working example of the present invention.

As shown in FIG. 9, the mobile station in the second working example transmits second pilot signals when E-DPDCH is transmitted at a transmission speed that is at least a prescribed transmission speed threshold value, as in the first working example.

However, in contrast with the first working example, the mobile station in the second working example, when transmitting second pilot signals, transmits second pilot signals during a prescribed pilot signal transmission time interval from the next TTI regardless of the transmission speed. The mobile station does not transmit second pilot signals during the transmission of the first data block in the figure (a data block of 384 kbps), but during the transmission of the second data block (a data block of 1024 kbps), the mobile station transmits second pilot signals, and in the next TTI, transmits second pilot signals but does not transmit E-DPDCH.

In addition, the pilot signal transmission time interval is also reported to the base station in advance, the base station detects E-TFCI, and if this E-TFCI is equal to or greater than a prescribed transmission speed, the base station determines that second pilot signals are transmitted during the interval of that TTI and the following pilot signal transmission time interval. Accordingly, the base station uses first and second pilot signals in channel estimation for data blocks of at least a prescribed transmission speed and data blocks that are received during the following pilot signal transmission time interval. In addition, when the base station receives data blocks of at least a prescribed transmission speed, the base station uses first and second pilot signals to measure SIR for high-speed closed-loop transmission power control during the following pilot signal transmission time interval.

As described above, a mobile station transmits second pilot signals when transmitting data blocks at the transmission speed threshold value or greater, and further, transmits second pilot signals during the subsequent pilot signal transmission time interval, whereby the base station can use second pilot signals in SIR measurement from the next TTI in which the transmission of second pilot signals begins. In traffic in which packets are generated in bursts such as in file transfer or web browsing, and moreover, in which packets are comparatively large, high-speed transmission is usually continuous during fixed time intervals, and as a result, the SIR measurement accuracy can be effectively increased during reception of data blocks that have been transmitted at high-speed according to the present invention. In this way, the accuracy of transmission power control can be improved to decrease the block error rate and thus improve throughput.

Figure 10:
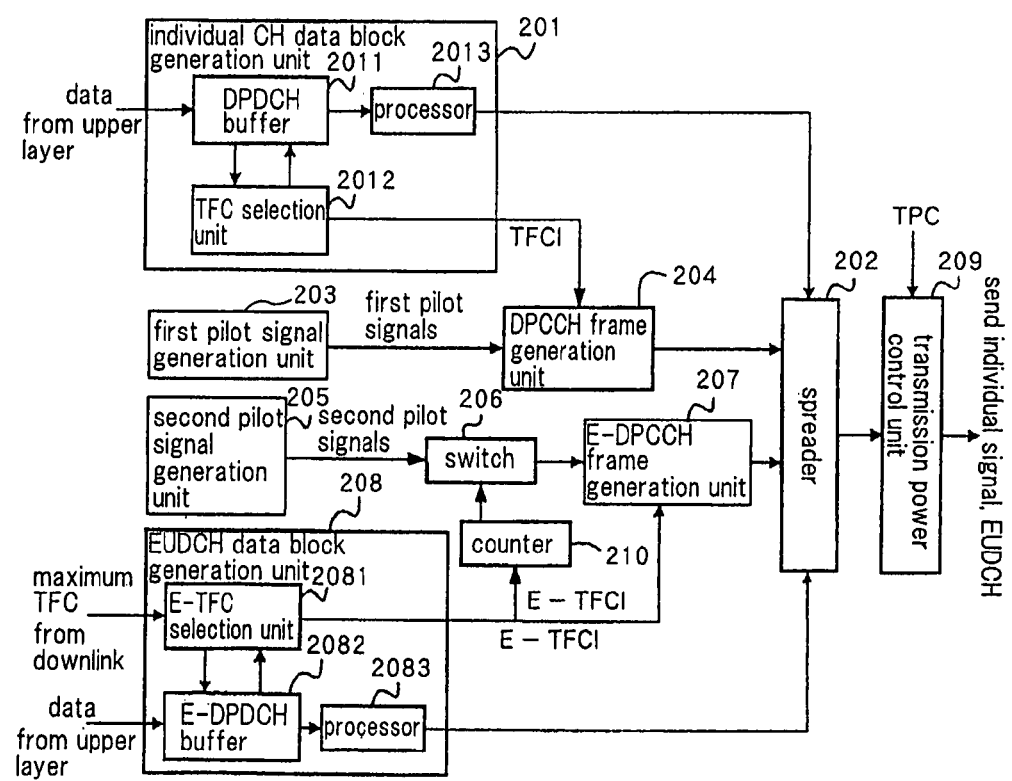
FIG. 10 shows the configuration of a mobile station in the second working example of the present invention.

FIG. 10 shows the configuration of a mobile station used in the present embodiment.

The mobile station in the second working example is provided with counter 210 that was not provided in the mobile station in the first working example. The configuration is otherwise the same as that of the mobile station in the first working example.

Counter 210 acquires E-TFCI information from E-TFCI selection unit 2081, and if the transmission speed indicated by E-TFCI is equal to or greater than a prescribed transmission speed threshold value (in this case, 1024 kbps), counter 210 begins counting the number of TTI from the next TTI and turns switch 206 ON such that second pilot signals are transmitted on E-DPCCH. Counter 210 then turns switch 206 ON during the interval in which the count value is smaller than the prescribed pilot signal transmission time interval. When the count value attains the pilot signal transmission time interval, counter 210 turns switch 206 OFF such that second pilot signals are not transmitted on E-DPCCH. If the transmission speed indicated by E-TFCI is equal to or greater than the transmission speed threshold value, counter 210 resets the count value.

Figure 11:
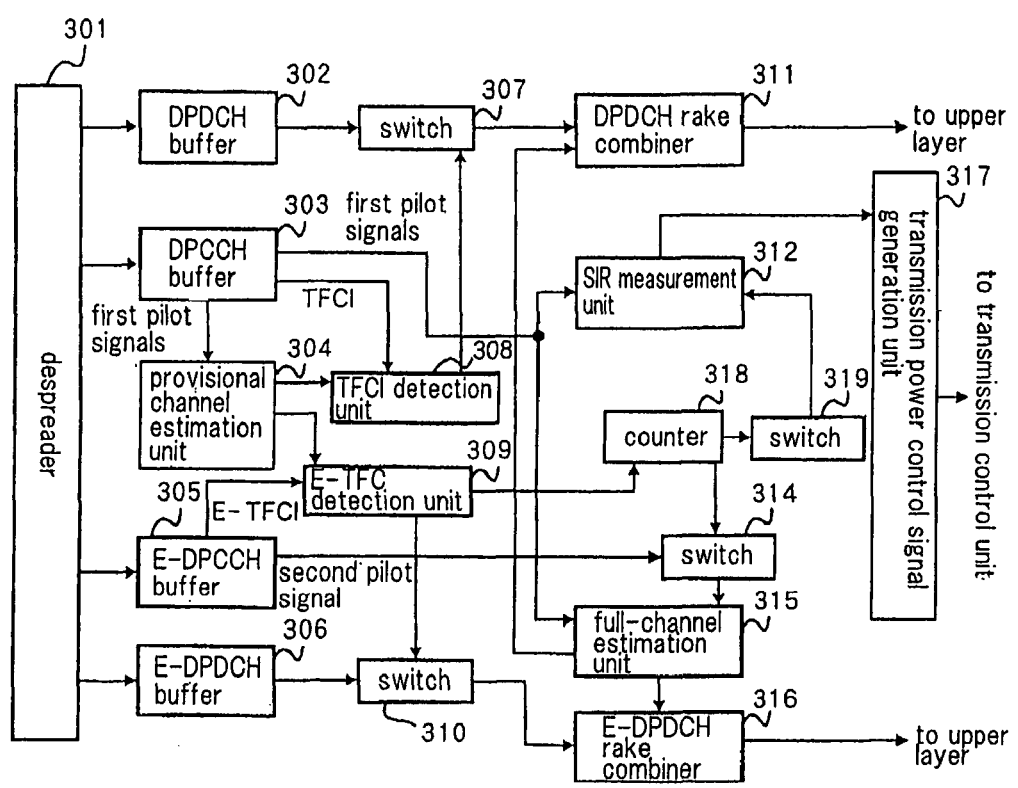
FIG. 11 shows the configuration of a base station in the second working example of the present invention.

FIG. 11 shows the configuration of the base station used in the second working example.

The base station in the second working example is not provided with pilot detection unit 313, with which the base station was provided in the first embodiment. In place of a pilot detection unit, the base station in the second working example is provided with counter 318. If the transmission speed indicated by E-TFCI from E-TFCI detection unit 309 is equal to or greater than a prescribed transmission speed threshold value (1024 kbps), counter 318 turns switch 314 ON such that second pilot signals received in that TTI are sent to full-channel estimation unit 315, turns ON both switch 314 and switch 319 such that second pilot signals are sent to SIR measurement unit 312 and full-channel estimation unit 315 from the next TTI, and begins counting.

Counter 318 keeps both switches ON during the interval that the count value is less than or equal to the prescribed pilot signal transmission time interval. In addition, if the value that is indicated by E-TFCI that is given during the interval that the switches are ON is equal to or greater than the transmission speed threshold value, counter 318 resets the count value and again begins counting from the next TTI of the data blocks. When the count value then attains the pilot signal transmission time interval, counter 318 turns OFF both switches such that second pilot signals are not sent to SIR measurement unit 312 and full-channel estimation unit 315 from the next TTI. The control unit is otherwise identical to that of the first working example. In the present embodiment, when the base station erroneously receives E-TFCI, the base station synthesizes only noise on the assumption that second pilot signals exist even though second pilot signals are not transmitted, and thus causes deterioration of the channel estimation accuracy and SIR measurement accuracy. In order to reduce the possibility of the occurrence of this state, error detection code such as CRC together with E-TFCI may be transmitted on E-DPCCH. In this way, the probability of the erroneous reception of E-TFCI is reduced, and the probability of using only received signals of second pilot signals that have not been transmitted (accordingly, only noise and interference components) and thus degrading the channel estimation accuracy and SIR measurement accuracy is reduced.

As described in the foregoing explanation, according to the present embodiment, the mobile station transmits second pilot signals if the transmission speed of data blocks of E-DP-DCH that are transmitted is higher than a prescribed transmission speed threshold value and transmits second pilot signals during the prescribed pilot signal transmission time interval after the transmission of the data blocks. The pilot signal transmission time interval has been reported to the base station in advance, and as a result, if the base station detects E-TFCI of at least the transmission speed threshold value, the base station can determine that second pilot signals are transmitted during the subsequent pilot signal transmission time interval. Accordingly, the base station can also use second pilot signals for SIR measurement from the next TTI, and can therefore improve the transmission power control accuracy. As a result, the block error rate is reduced and throughput increased.

Third Working Example

Explanation next regards the third working example of the present invention.

Figure 12:
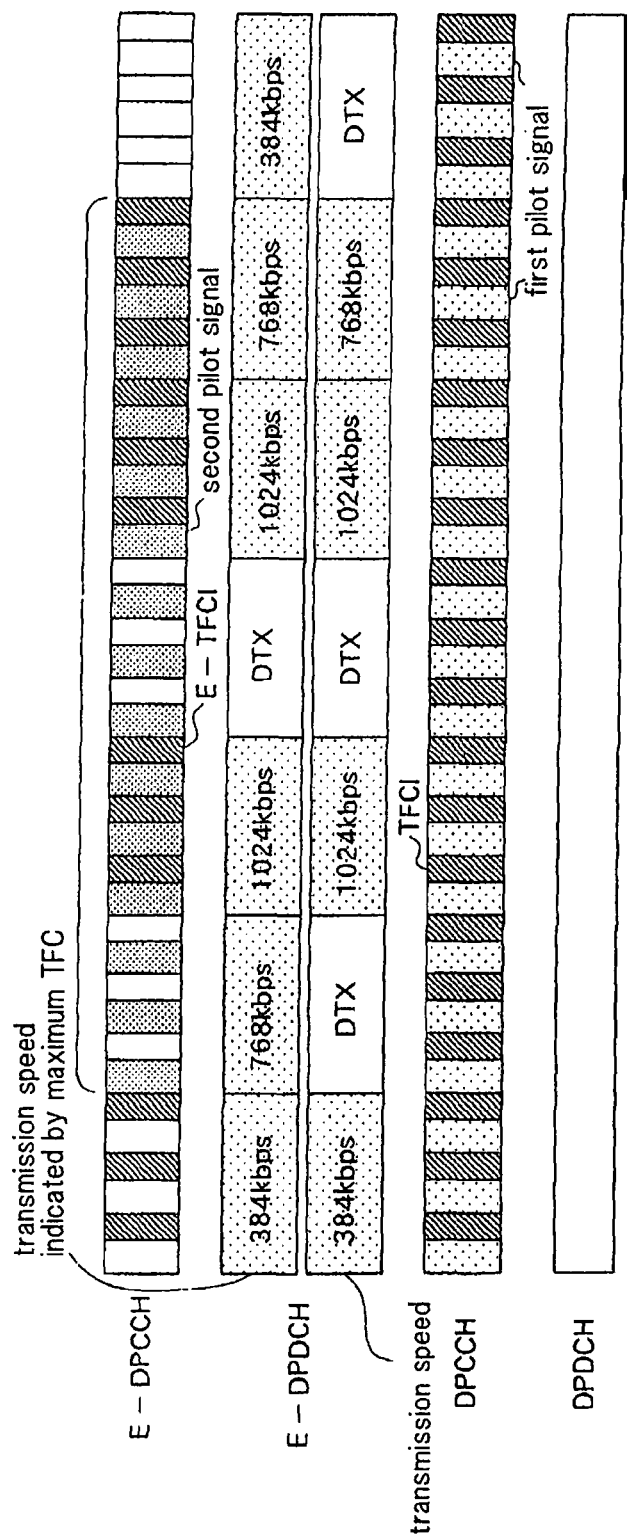
FIG. 12 is a view for explaining the method of transmitting pilot signals in the third working example of the present invention.

As shown in FIG. 12, a mobile station also transmits second pilot signals according to a prescribed transmission speed threshold value in the third working example, similar to the first working example. However, in contrast to the case of the first working example, a mobile station in the third working example transmits second pilot signals when the transmission speed according to a maximum TFC that is designated in the base station (maximum transmission speed) is at least a prescribed transmission speed threshold value. In the figure, the third bar from the top shows the data block that is actually being transmitted in E-DPDCH and its transmission speed.

The second bar from the top shows the maximum transmission speed that is permitted for use in E-DPDCH. In this case, because the transmission speed threshold value is set to 768 kbps, second pilot signals are not transmitted in the first TTI in which a maximum transmission speed of 384 kbps has been assigned, but in the second TTI in which a maximum transmission speed of 768 kbps has been assigned, data blocks are not transmitted but second pilot signals are transmitted.

The maximum TFC is assigned by the base station, and the base station therefore knows beforehand whether second pilot signals are transmitted or not. Accordingly, when a maximum transmission speed that is at least the transmission speed threshold value has been assigned to a mobile station, the base station uses both first and second pilot signals in channel estimation as well as SIR measurement while this maximum transmission speed is effective. The base station otherwise uses only first pilot signals.

As described hereinabove, the mobile station transmits second pilot signals during the interval in which the maximum transmission speed designated by the base station is equal to or greater than the transmission speed threshold value, and the base station can therefore know beforehand the transmission timing of the second pilot signals. As a result, the base station can use the second pilot signals in SIR measurement for high-speed closed-loop transmission power control and thus improve the transmission power control accuracy, reduce the block error rate, and improve throughput.

Further, in the present working example, when the maximum TFC is controlled by a differential signal, i.e., when the base station designates the maximum TFC by transmitting signals instructing that the maximum TFC of the mobile station be increased or decreased from the current value, the mistaken reception of a differential signal by a mobile station may cause the maximum transmission speed that is recognized at the mobile station to fall below the transmission speed threshold value even when the maximum transmission speed recognized by the base station is equal to or greater than the transmission speed threshold value. In such a case, the base station determines that second pilot signals are being transmitted and uses the received signals of the second pilot signals to carry out channel estimation and SIR measurement, whereby noise is increased and channel estimation accuracy and SIR measurement accuracy are degraded. In order to avoid this situation, the transmission speed threshold value of the base station (transmission speed threshold value 1) may be set greater than the transmission speed threshold value in the mobile station (transmission speed threshold value 2).

Figure 13:
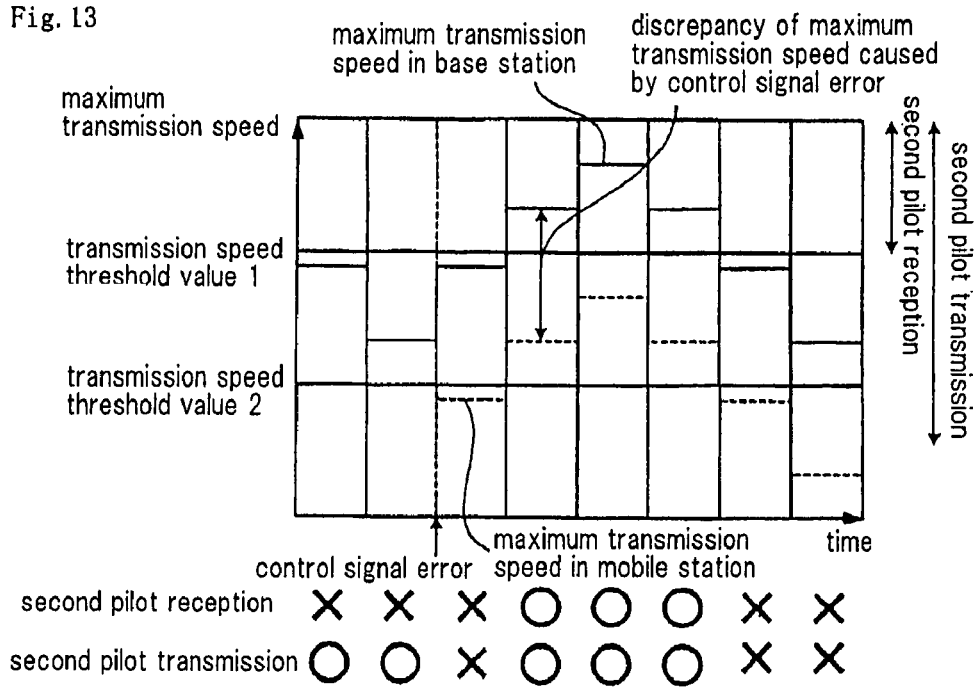
FIG. 13 shows the occurrence of discrepancy between the maximum transmission speed recognized by a base station and the maximum transmission speed recognized by a mobile station when reception error occurs in a differential signal.

As shown in FIG. 13, when a reception error occurs in a differential signal, a discrepancy occurs between the maximum transmission speed recognized by the base station and the maximum transmission speed recognized by the mobile station. If the difference between transmission speed threshold value 1 and transmission speed threshold value 2 is greater than this discrepancy, when the base station recognizes that second pilot signals are being transmitted, the mobile station must be transmitting the second pilot signals, and the above-described situation does not occur.

Figure 14:
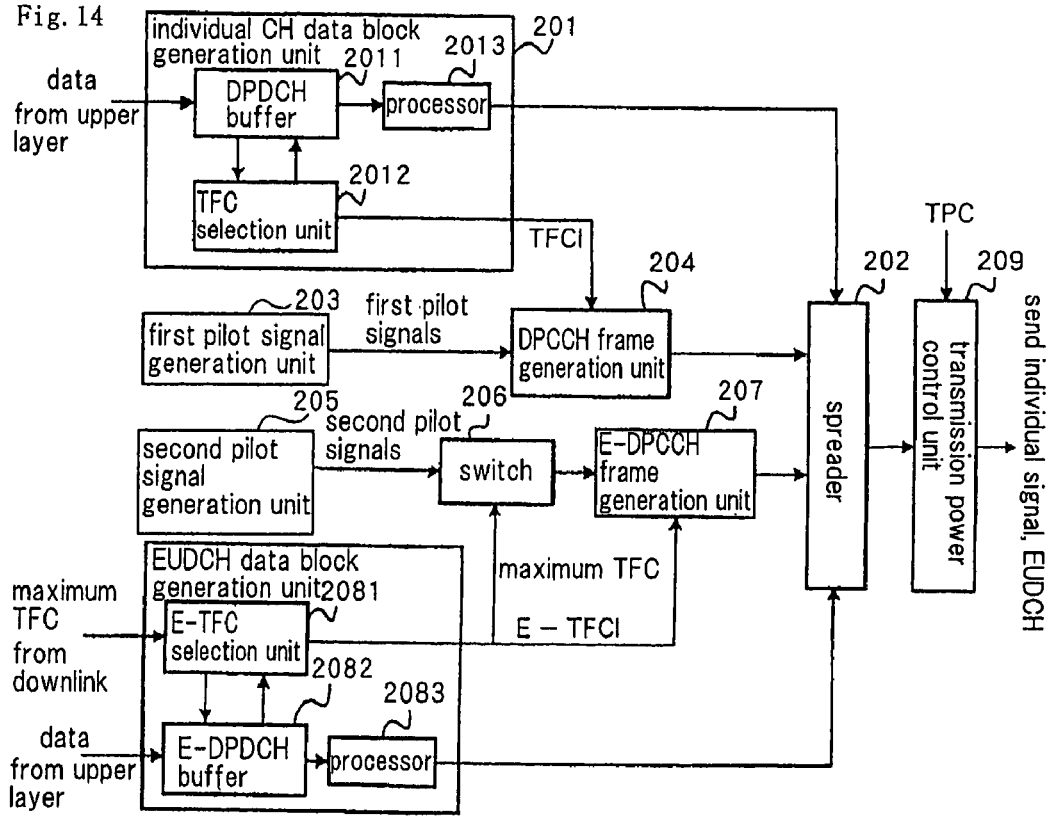
FIG. 14 shows the configuration of a mobile station in the third working example of the present invention.

FIG. 14 shows the configuration of the mobile station that is used in the present embodiment.

The configuration of the mobile station in the third working example is the same as the configuration of the mobile station in the first working example. However, in contrast to the first working example in which E-TFC selection unit 2081 reports the selected E-TFC to switch 206, in the present working example, E-TFC selection unit 2081 reports to switch 206 the maximum TFC reported from the base station. As in the first embodiment, when the transmission speed of the reported E-TFCI (in this case indicating the maximum TFC) is equal to or greater than a prescribed transmission speed threshold value, switch 206 turns ON such that second pilot signals are inserted into E-DPCCH, switch 206 otherwise being OFF. The operation of the mobile station is otherwise identical to that of the first working example.

Figure 15:
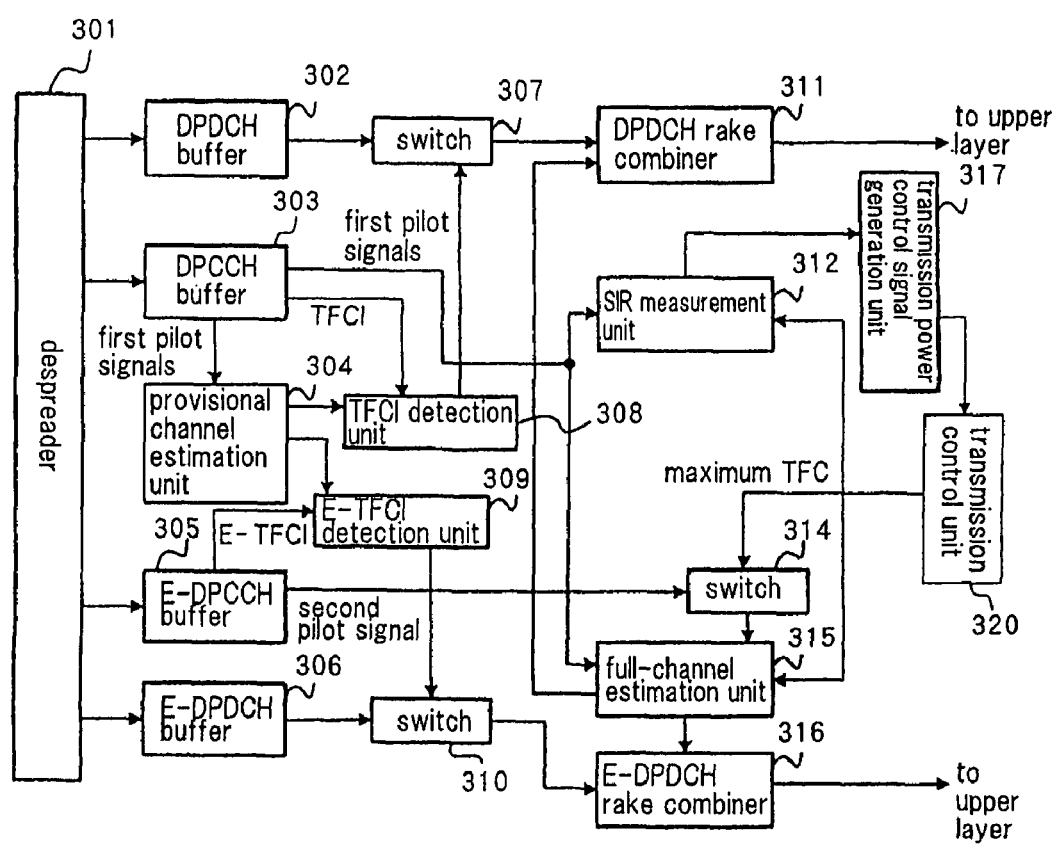
FIG. 15 shows the configuration of a base station used in the third working example of the present invention.

FIG. 15 shows the configuration of the base station used in the third working example.

The base station in the third working example is not provided with counter 318 that is provided in the base station in the second working example. Maximum TFC information that has been assigned to the mobile station is sent to switch 314 from transmission control unit 320 in the base station instead. When the transmission speed of the maximum TFC is equal to or greater than the prescribed transmission speed threshold value, switch 314 then turns ON such that second pilot signals are sent to SIR measurement unit 312 as well as full-channel estimation unit 315, switch 314 otherwise remaining OFF. The operation is otherwise identical to the mobile station in the second working example.

As described in the foregoing explanation, according to the present embodiment, when the transmission speed of the maximum TFC that is assigned to the base station is equal to or greater than a prescribed transmission speed threshold value, the mobile station transmits second pilot signals. The maximum TFC is determined by the base station, and the base station therefore knows in advance the timing at which the mobile station transmits second pilot signals. Accordingly, when second pilot signals are being transmitted, the base station can also use the second pilot signals to measure SIR for use in transmission power control, and thus can improve the accuracy of transmission power control, reduce the block error rate, and further, improve throughput.

The invention claimed is:

1. A pilot signal transmission method comprising steps of:
in a mobile station:
  transmitting first pilot signals on a first channel; and
  transmitting second pilot signals on a second channel according to a transmission speed of data that are transmitted on the second channel;
in a base station:
  measuring a first reception quality for said first pilot signals and a second reception quality for said second pilot signals;
  determining whether said second pilot signals are used depending on the first reception quality of said first pilot signals and the second reception quality of said second pilot signals;
  when said second pilot signals are used, using said first pilot signals and said second pilot signals to measure a single reception quality for combined signals received in all channels;
  when said second pilot signals are not used, using only said first pilot signals to measure a single reception quality for combined signals received in all channel; and
  generating transmission power control signals based on results of measuring said reception quality; and
in said mobile station:
  determining a transmission power of said first and said second channels according to said transmission power control signals that have been generated in said base station,
  wherein said base station uses the first pilot signals and the second pilot signals in the measuring of said single reception quality when the second reception quality of said second pilot signals is higher than a prescribed first reception quality threshold value;

wherein said first reception quality threshold value is determined based on the first reception quality of said first pilot signals.

2. The pilot signal transmission method according to claim 1, wherein said base station uses said first pilot signals and said second pilot signals in the measuring of said reception quality when the reception quality of said first pilot signals or the reception quality of said second pilot signals is higher than a prescribed second reception quality threshold value, and when the reception quality of said second pilot signals is higher than a third reception quality threshold value that is determined based on the reception quality of said first pilot signals, said base station uses said first pilot signals and said second pilot signals in the measuring of said reception quality.

3. The pilot signal transmission method according to claim 1, wherein said base station uses said second pilot signals in channel estimation.

4. A pilot signal transmission method comprising steps of:
in a mobile station:
transmitting first pilot signals on a first channel;
transmitting second pilot signals on a second channel when data blocks are being transmitted at a higher transmission speed than a prescribed transmission speed threshold value on said second channel said transmitting of the second pilot signals occurring until a prescribed pilot signal transmission time interval has elapsed; and
in a base station:
extracting control signals indicating the transmission speed of data blocks from said second channel;
when the transmission speed of said data blocks is higher than a prescribed transmission speed threshold value, using first and second pilot signals to measure a single reception quality for combined signals received in all channels until said pilot signal transmission time interval has elapsed after the reception of data blocks at said transmission speed that is higher than said transmission speed threshold value;
using only first pilot signals to measure a single reception quality for combined signals received in all channels at times other than said pilot signal transmission time interval; and
generating transmission power control signals according to reception quality measurement results; and
in said mobile station:
determining a transmission power of said first and said second channel according to said transmission power control signals that have been generated in said base station.

5. The pilot signal transmission method according to claim 4, wherein said base station uses said second pilot signals in channel estimation.

6. A pilot signal transmission method comprising steps of:
in a base station:
transmitting a maximum transmission speed control signal for reporting information relating to a maximum transmission speed that is permitted for use in a second channel;
in a mobile station:
transmitting first pilot signals on a first channel;
determining the maximum transmission speed of said second channel based on said maximum transmission speed control signal that has been reported from said base station; and
transmitting a second pilot signal on said second channel when the maximum transmission speed of said second channel is higher than a prescribed mobile station transmission speed threshold value;
in said base station:
using said first and said second pilot signals to measure a single reception quality for combined signals received in all channels when said maximum transmission speed that has been permitted for use on said second channel is higher than a prescribed base station transmission speed threshold value;
using said first pilot signals to measure said single reception quality for combined signals received in all channels when said maximum transmission speed of said second channel is lower than said prescribed base station transmission speed threshold value; and
generating transmission power control signals according to reception quality measurement results; and
in said mobile station:
determining a transmission power of said first and said second channel according to said transmission power control signals that has been reported from said base station,
wherein said prescribed base station transmission speed threshold value is set higher than said prescribed mobile station transmission speed threshold value.

7. The pilot signal transmission method according to claim 6, wherein said base station uses said second pilot signals in channel estimation.

8. A radio communication system comprising:
a mobile station for determining a transmission power of a first and second channel according to transmission power control signals, transmitting first pilot signals on said first channel, and transmitting second pilot signals on said second channel according to a transmission speed of data that are transmitted on said second channel; and
a base station for measuring a first reception quality for said first pilot signals and a second reception quality for said second pilot signals, determining whether said second pilot signals are used according to the first reception quality of said first pilot signals and the second reception quality of said second pilot signals, using said first pilot signals and said second pilot signals to measure a single reception quality for combined signals received in all channels when said second pilot signals are used, measuring said single reception quality for combined signals received in all channels by only said first pilot signals when said second pilot signals are not used, and generating said transmission power control signals based on reception quality measurement results,
wherein said base station uses the first pilot signals and the second pilot signals in the measuring of said single reception quality when the second reception quality of said second pilot signals is higher than a prescribed first reception quality threshold value;
wherein said first reception quality threshold value is determined based on the first reception quality of said first pilot signals.

9. A radio communication system comprising:
a mobile station for determining a transmission power of a first and second channel according to transmission power control signals, transmitting first pilot signals on said first channel, transmitting second pilot signals on said second channel when data blocks are transmitted on said second channel at a higher transmission speed than a prescribed transmission speed threshold value, said transmitting of the second pilot signals occurring until a prescribed pilot signal transmission time interval has elapsed; and a base station for extracting control signals indicating the transmission speed of data blocks from said second channel, using first and second pilot signals to measure a single reception quality for combined signals received in all channels until said pilot signal transmission time interval has elapsed from the reception of data blocks in which said transmission speed is higher than the transmission speed threshold value, using first pilot signals to measure said single reception quality for combined signals received in all channels at times other than said pilot signal transmission time interval, and generating said transmission power control signals according to reception quality measurement results.

10. A radio communication system comprising:

a mobile station for determining a transmission power of a first and second channel according to transmission power control signals, transmitting first pilot signals on said first channel, and transmitting second pilot signals on said second channel when a maximum transmission speed of said second channel that has been reported is higher than a prescribed mobile station transmission speed threshold value; and a base station for reporting to said mobile station the maximum transmission speed of said second channel, using said first and said second pilot signals to measure a single reception quality for combined signals received in all channels when the maximum transmission speed of said second channel is higher than a prescribed base station transmission speed threshold value, using said first pilot signals to measure said single reception quality for combined signals received in all channels when the maximum transmission speed of said second channel is lower than said base station transmission speed threshold value, and generating said transmission power control signals according to reception quality measurement results, wherein said base station transmission speed threshold value is set higher than said mobile station transmission speed threshold value.

11. A mobile station in a radio communication system that is provided with a base station for measuring a first reception quality for said first pilot signals and a second reception quality for said second pilot signals, determining whether second pilot signals are used according to the first reception quality of first pilot signals and the second reception quality of said second pilot signals, using said first pilot signals and said second pilot signals to measure a single reception quality for combined signals received in all channels when said second pilot signals are used, using only said first pilot signals to measure said single reception quality for combined signals received in all channels when said second pilot signals are not used, and generating transmission power control signals based on reception quality measurement results, said base station uses the first pilot signals and the second pilot signals in the measurement of said single reception quality when the second reception quality of said second pilot signals is higher than a prescribed first reception quality threshold value and said first reception quality threshold value is determined based on the first reception quality of said first pilot signals; said mobile station comprising:

a transmission power control unit for determining a transmission power of said first and said second channels according to said transmission power control signals transmitted from said base station;

a first frame generation unit for transmitting first pilot signals on said first channel; and a second frame generation unit for transmitting said second pilot signals on said second channel according to a transmission speed of data transmitted on said second channel.

* * * * *